United States Patent [19]
Hongou et al.

[11] Patent Number: 5,203,226
[45] Date of Patent: Apr. 20, 1993

[54] STEERING WHEEL PROVIDED WITH LUMINOUS DISPLAY DEVICE

[75] Inventors: Suzuaki Hongou, Ichinomiya; Hitoshi Oshima; Mitsuhiro Kikuta, both of Nagoya, all of Japan

[73] Assignee: Toyoda Gosei Co., Ltd., Nishikasugai, Japan

[21] Appl. No.: 683,812

[22] Filed: Apr. 11, 1991

[30] Foreign Application Priority Data

Apr. 17, 1990 [JP] Japan ................................. 2-101086
Apr. 18, 1990 [JP] Japan ................................. 2-104147

[51] Int. Cl.$^5$ ........................ B62D 1/04; G05G 1/10; B60Q 1/00
[52] U.S. Cl. ........................................ 74/552; 362/61; 362/31
[58] Field of Search ............. 74/552; 362/61, 31, 362/26; 280/779

[56] References Cited

U.S. PATENT DOCUMENTS

| | | | |
|---|---|---|---|
| 2,672,117 | 3/1954 | Morphew | 362/26 X |
| 3,043,038 | 7/1962 | Marble | 362/26 |
| 3,078,364 | 2/1963 | Neugebauer | 362/26 |
| 4,257,084 | 3/1981 | Reynolds | 362/26 X |
| 4,616,291 | 10/1986 | Sarnezki et al. | 362/26 X |
| 4,800,466 | 1/1989 | Bauer et al. | 362/26 |
| 4,905,125 | 2/1990 | Stefan et al. | 362/61 |
| 4,918,577 | 4/1990 | Furudate | 362/31 |
| 4,954,930 | 9/1990 | Maegawa et al. | 362/31 X |
| 4,991,535 | 2/1991 | Kobayashi et al. | 362/26 |

FOREIGN PATENT DOCUMENTS

57-120166 7/1982 Japan ................................. 74/552

*Primary Examiner*—Vinh T. Luong
*Attorney, Agent, or Firm*—Cushman, Darby & Cushman

[57] ABSTRACT

A steering wheel including a pad portion mounted on a boss portion, a ring portion supported on the boss portion via spokes, a horn button mounted on an upper surface of the pad portion, and a display portion of a luminous display device. The display portion is mounted on a part of the pad portion close to the driver's side, and the horn button is mounted on the part of the pad portion close to a front window of a vehicle. Only the part of the pad portion on which the display portion is mounted is inclined toward the driver's side so that the front window does not fall within a light projecting region of said display portion. The luminous display device includes a translucent light-dissipation plate mounted in an opening of a reflection chamber. The thickness of the dissipation plate becomes progressively smaller away from a main light-emitting element provided within the reflection chamber. A sub light-emitting element is mounted below a character plate and disposed close to the reflection chamber. A light-reducing wall is provided between the dissipation plate and the main light-emitting element so as to prevent the lights, emitted respectively from the main and sub light-emitting elements, from being mixed together.

6 Claims, 6 Drawing Sheets

STEERING WHEEL PROVIDED WITH LUMINOUS DISPLAY DEVICE

BACKGROUND OF THE INVENTION

1. Field of the Invention

This invention relates to a steering wheel provided with a luminous (light-emitting) display device, and more particularly to a steering wheel having a luminous display device mounted on a pad portion or other portion of the steering wheel of a vehicle so as to display operating conditions of various devices by way of predetermined characters or signs.

2. Description of the Prior Art

In conventional steering wheels of the type described, there have been adopted various countermeasures against the situation in which light from a luminous display device is reflected in a front window of a vehicle, thereby hindering the driving of the vehicle. For example, in Japanese Utility Model Unexamined Publication No. 57-120166, there is proposed a steering wheel of the type where a luminous display device is covered with a light-intercepting cover member so as to prevent the light from being reflected by a front window. There is further proposed a steering wheel of the type a luminous display device is mounted deep in a hole formed in a pad portion of the steering wheel, in order to prevent the dissipation of the light from the luminous display device, thereby preventing the light from being reflected in the front window.

However, the former steering wheel utilizing the light-intercepting cover member has a problem where the light-intercepting cover member is projected beyond the surface of the pad portion, thus detracting from the appearance of the steering wheel. Another problem of the steering wheel with the light intercepting cover member is that the number of component parts is increased because of the light-intercepting cover member.

In the steering wheel having the luminous display device mounted in the hole in the pad portion, the pad portion must have a considerable thickness to accommodate this construction, thus resulting in a problem that the steering wheel is disposed closer to the driver. To overcome this difficulty, it is necessary to extensively modify the design of a steering column portion so as to adjust the position of the steering wheel.

One example of conventional luminous display device used in a steering wheel is shown in FIG. 7. This luminous display device is mounted on a flat portion of a pad portion 2 of the steering wheel. In FIG. 7, the upper side represents the upper surface side of the pad portion 2, and the lower side represents the interior side of the pad portion 2. A through hole 23a is formed through the pad portion 2, and a lamp unit 30 is mounted in the through hole 3 from the inner side of the pad portion 2. The lamp unit 30 has a reflection chamber 9 open to the through hole 23a of the pad portion 2. A display lamp 15 is mounted on one side of the reflection chamber 9. A bottom wall 9b of the reflection chamber 9 is inclined, and defines a reflection surface 11. A flat dissipation plate 31 is mounted within the through hole 3, and closes the opening of the reflection chamber 9. A transparent character plate 6 is mounted on the upper surface of the pad portion 2 via a printing layer 18. Printing is not applied to predetermined character portions of the printing layer 18 through which the light emitted from the display lamp 15 is transmitted. The light emitted from the display lamp 15 is reflected by the reflection surface 11, so that the direction of travel of the light is changed, and then the reflected light transmits through and is dissipated by the dissipation plate 31. Then, the dissipated light transmits through the transparent portions of the character plate 6. Therefore, the characters are luminously displayed on the character plate 6, thereby transmitting predetermined information to the driver.

A light-emitting diode (LED) 20 is provided within the through hole 23a, and light from the LED 20 does not transmit through the dissipation plate 31 but transmits directly through the transparent portions of the character plate 6, thereby luminously displaying the signs on the character plate 6.

However, when the light from the display lamp 15 is to be reflected by the reflection surface 11 as described above, the light reflected by those portions of the reflection surface Il farther from the display lamp 15 travels along longer paths before reaching the dissipation plate 31. Therefore, the farther the light reflected by the reflection surface 11 is from the display lamp 15, the weaker the light reaching the dissipation plate 31 becomes. Hence, the distribution of the light is uneven, thus resulting in a problem that the luminous conditions of the characters on the character plate 6 become uneven.

Further, since no partition wall is provided between the upper side of the dissipation plate 31 and the LED 20, the light dissipated by the dissipation plate 31 is mixed with the light emitted from the LED 20, so that the display of the characters and signs becomes unclear. Further, in the case where the color tone of the light emitted from the display lamp 15 is different from that of the light emitted from the LED 20, there is encountered the problem that each of the characters and signs cannot be made luminous in a desired color tone because of the mixing of the two lights.

SUMMARY OF THE INVENTION

With the above problems of the prior art in view, it is a first object of this invention to provide a steering wheel having a luminous display device, wherein the light from the luminous display device is prevented from being reflected in a front window to thereby give a clear field of vision to the driver. It is a further object that attachment of the luminous display device does not need any modification of other parts of the steering wheel mechanism such as a steering column. Another object is to maintain the number of component parts of the luminous display device at a small figure. The luminous display device should provide a good appearance of the steering wheel.

A further object of the invention is to provide a luminous display device for mounting on a steering wheel, which makes a distribution of light uniform, thereby preventing unevenness of the display, and prevents light from different light sources from being mixed together, thereby achieving a clear display in a desired color tone.

In order to achieve the objects of the present invention, the present invention provides a steering wheel comprising a pad portion mounted on a boss portion, a ring portion supported on the boss portion via spokes, a horn button mounted on an upper surface of the pad portion, and a display portion of a luminous display device with the display portion being mounted on a part of the pad portion close to the driver's side and the said horn button being mounted on the part of the pad portion close to a front window of a vehicle. Only the portion of the pad portion on which the display portion is mounted is inclined toward the driver's side so as to be disposed out of a light projecting region of the display portion.

In this steering wheel, the part of the pad portion on which the display portion is mounted is inclined toward the driver's side, and therefore the front window of the vehicle is out of the light-projecting region of the display portion, and the light emitted from the display portion is prevented from being reflected in the front window.

The light is prevented from being reflected in the front window simply by inclining the display portion-mounting portion of the pad portion toward the driver's side, and an additional part such as a light-intercepting cover is not needed, and also it is not necessary to considerably increase the thickness of the pad portion.

The present invention provides a luminous display mounted on a steering wheel comprising a reflection chamber having an opening at one side thereof, a main light-emitting element mounted within the reflection chamber, a reflection surface provided in the reflection chamber for reflecting light emitted from the main light-emitting element and for directing the light toward the exterior through the opening, a translucent dissipation plate mounted in the opening so as to dissipate the light, a character plate mounted above the dissipation plate so as to transmit the light through character portions of the character plate, and a sub light-emitting element mounted below the character plate and disposed close to the reflection chamber. The thickness of the dissipation plate becomes progressively smaller away from said main light-emitting element. A light-reducing wall is provided between the dissipation plate and the main light-emitting element so as to prevent the light, emitted from the main and sub light-emitting elements, from being mixed together.

In this luminous display device, the light from the main light-emitting element is reflected by the reflection surface so as to change its direction of travel. Then, the light is transmitted through the dissipation plate, and it then passes through the transparent portions of the character plate so as to form the characters or signs. Therefore, the characters or signs are luminously displayed on the character plate, so that necessary information is transmitted to the driver. The sub light-emitting element is lit in connection with the displayed characters on the character plate, or is lit regardless thereof so as to display other information.

As described above, when the light from the main light-emitting element is reflected by the reflection surface, the light reflected by those portions of the reflection surface farther from the main light-emitting element travels along longer paths before reaching the dissipation plate. Therefore, the farther the reflection surface is from the main light-emitting element, the more weak the light reaching the dissipation plate becomes. On the other hand, the thickness of the dissipation plate becomes progressively smaller away from the main light-emitting element, and the thinner portion of the dissipation plate has a higher light transmissivity. Therefore, the distribution of the light reaching the dissipation plate is made uniform.

Since the upper side of the dissipation plate is separated from the sub light-emitting element by the light-reducing wall, the light passed through and dissipated by the dissipation plate is further weakened when passing through the light-reducing wall, thus preventing this light from being mixed with the light from the sub light-emitting element.

Other objects, features and characteristics of the present invention, as well as methods of operation and the function of the related elements of the structure, will become apparent upon consideration of the following description and the appended claims with reference to the accompanying drawings, all of which from a part of this specification, wherein like reference numerals designate corresponding parts.

BRIEF DESCRIPTION OF THE DRAWINGS

In the drawings, the present invention and prior art are pictured wherein.

DETAILED DESCRIPTION OF THE PRESENTLY PREFERRED EXEMPLARY EMBODIMENTS

The steering wheel for a truck according to an embodiment of the present invention, will now be described with reference to the drawings.

Figure 2:
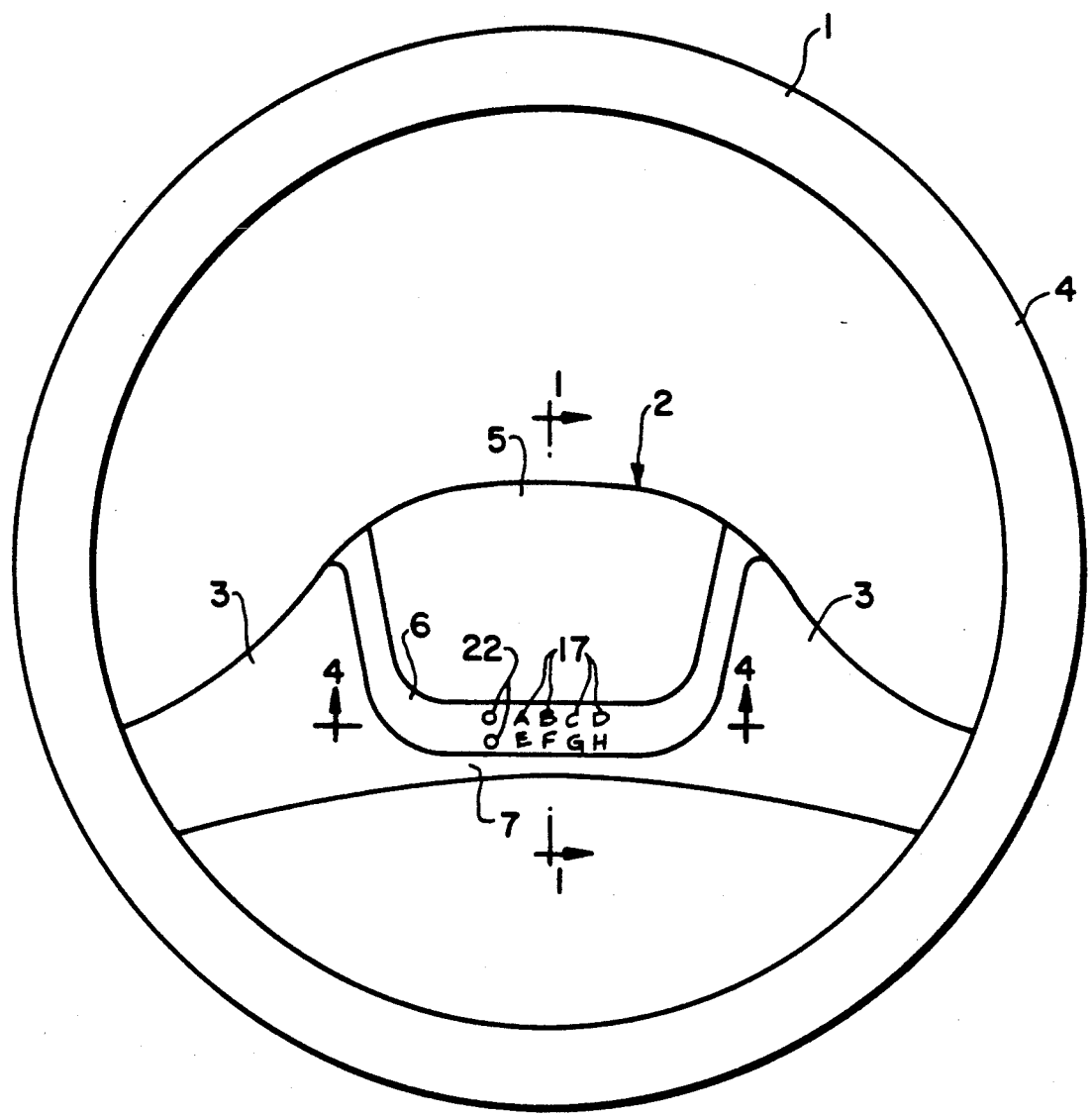
FIG. 2 is a front-elevational view of the steering wheel of FIG. 1.

FIG. 2 is a front-elevational view of the steering wheel of this embodiment. As shown in FIG. 2, the steering wheel 1 of this embodiment comprises two spokes 3, a pad portion 2 mounted on a boss portion (not shown), and a ring portion 4 supported on this boss portion via the spokes 3. The central portion of the pad portion 2 is covered with a horn button 5 of a soft resin, and a character plate 6 of a generally arcuate shape, which serves as a display portion, is mounted at the periphery of the horn button 5. The periphery of the character plate 6 joining the pad portion 2 is covered with a covering layer 7 continuous with the spokes 3.

Figure 1:
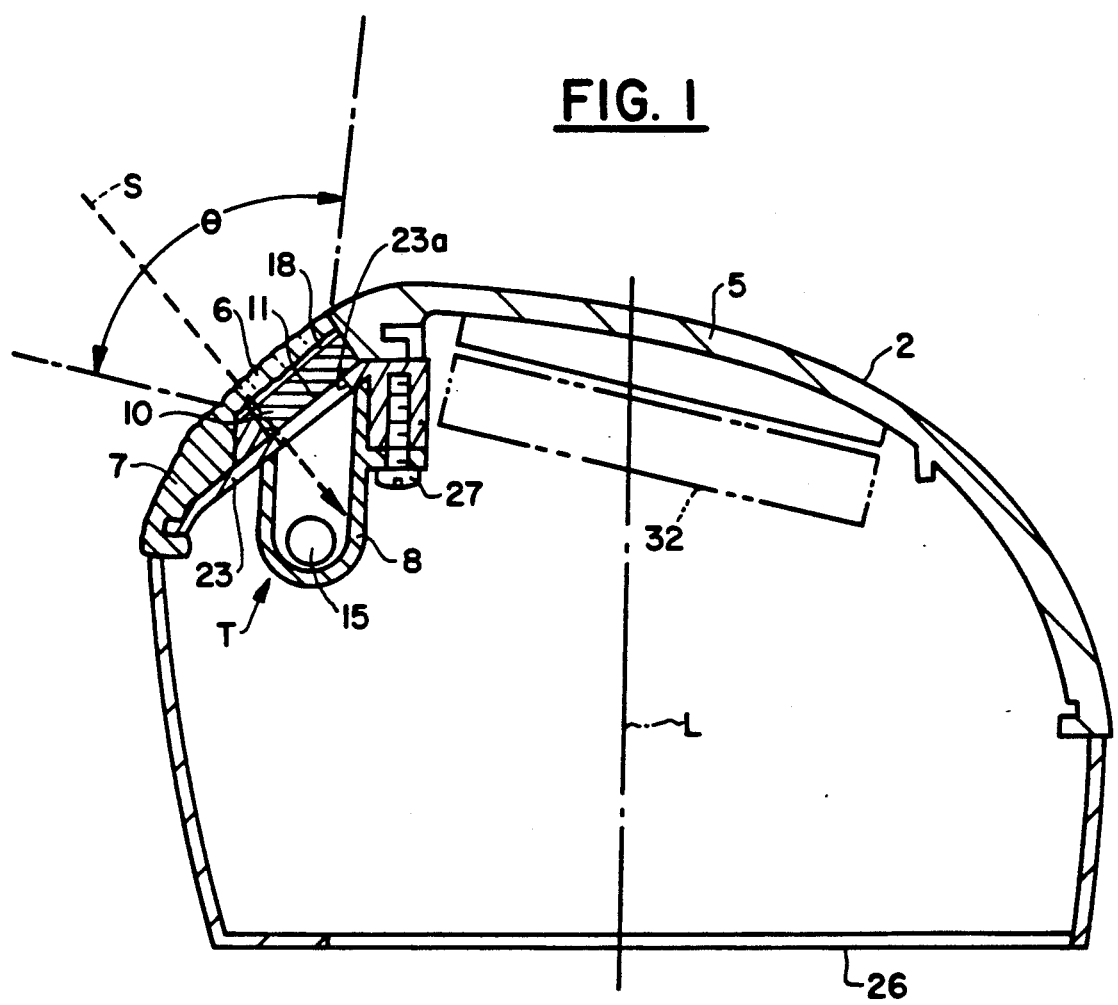
FIG. 1 is a vertical cross-sectional view taken along the line 1—1 of FIG. 2 of a pad portion of a steering wheel provided in accordance with the present invention.

FIG. 1 is a vertical cross-sectional view of the pad portion 2 taken along the line 1—1 of FIG. 2. In FIG. 1, the left side is the driver's side, and the right side is close to a front window 50 (FIG. 3) of the vehicle. As shown in FIG. 1, a body casing 26 of the pad portion 2 opens upwardly, and its opening is covered with the covering layer 7, the character plate 6 and the horn button 5, in this order from the driver's side. A horn switch 32 is provided at the lower side of the horn button 5. When the horn button 5 is pressed down to be flexed inwardly, the horn switch 32 is turned on to operate a horn of the vehicle.

A printing layer 18 is selectively formed on the reverse surface of the character plate 6, and the transparent portions of the character plate 6 on which the printing layer 18 is not formed define predetermined characters 17 (FIG. 2), respectively. In this embodiment, names ABCD and EFGH of two devices associated with the vehicle are displayed by the characters 17, the name ABCD being disposed above the name EFGH. A frame 11 is mounted on the reverse surface of the character plate 6, and a translucent dissipation plate 10 is mounted within the frame 11. A mounting member 23 is fixedly mounted on the reverse side of the frame 11, and the mounting member 23 interconnects the horn button 5 and the covering layer 7.

A reflector 8 of a U-shaped cross-section is fixedly secured to the reverse side of the mounting member 23 by a screw 27. The interior of the reflector 8 faces the character plate 6 via a through hole 23a, formed through the mounting member 23, and the interior of the frame 11. A display lamp 15 is mounted within the reflector 8. In this embodiment, the display lamp 15 is turned on or lit in response to the operation of a light switch provided on the vehicle. In the steering wheel 1 of this embodiment, a luminous display device T is constituted by the character plate 6, the dissipation plate 10, the reflector 8 and the display lamp 15.

When the display lamp 15 is lit, light emitted therefrom is reflected by the inner wall of the reflector 8, and then is transmitted through and dissipated by the dissipation plate 10, and further transmits only through the transparent character portions 17 of the character plate 6. As a result, the characters 17 are luminously displayed on the upper surface of the character plate 6.

Figure 3:
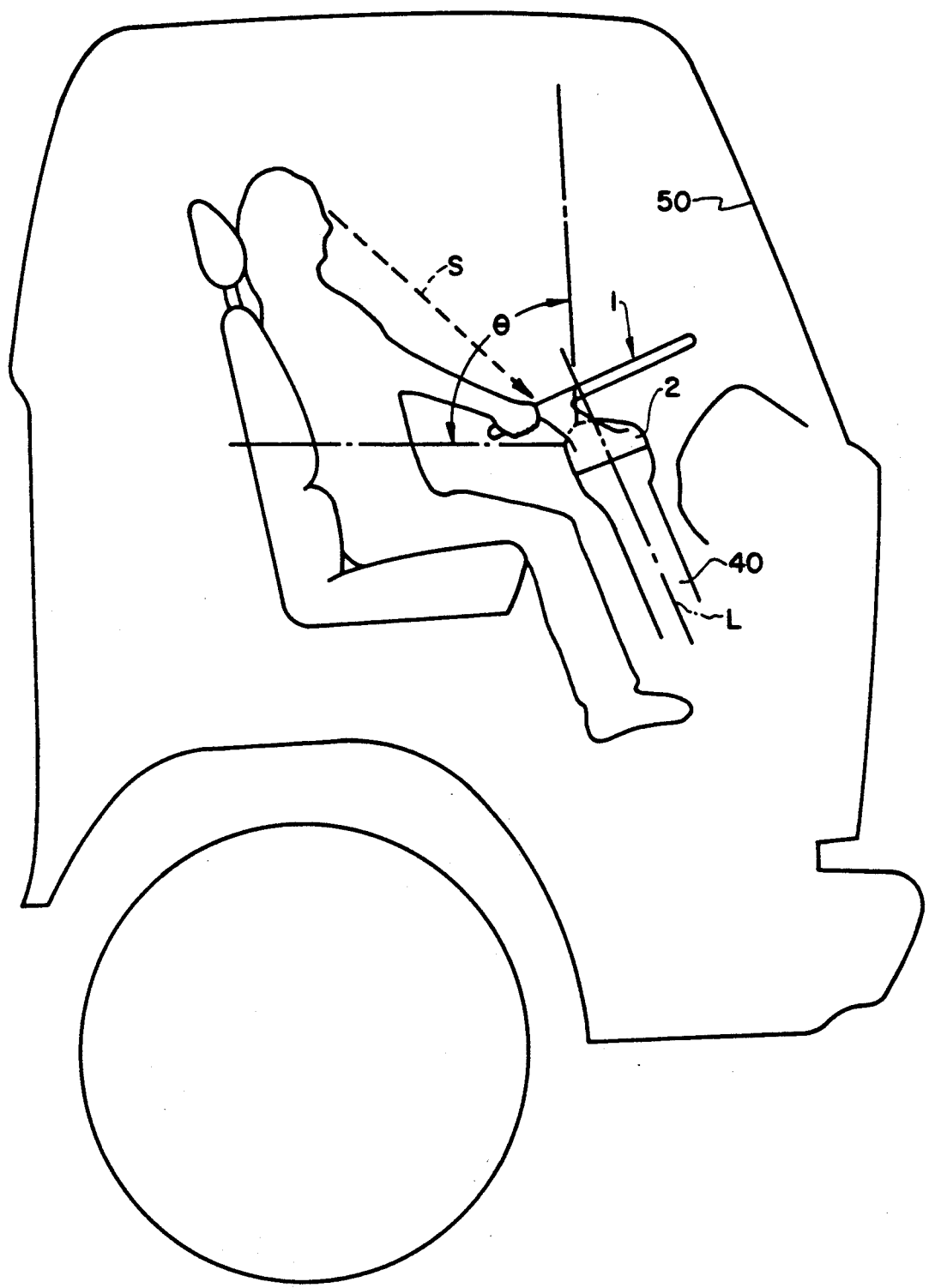
FIG. 3 is a schematic view showing the steering wheel mounted on a truck.

The shape of the surface of the pad portion 2 of the steering wheel 1 of this embodiment will now be described with reference to FIGS. 1 and 3. FIG. 3 is a schematic view showing the steering wheel I mounted on a steering column 40 of a truck. Reference character L in FIGS. 1 and 3 denotes an axis of rotation of the steering wheel 1. As shown in FIGS. 1 and 3, the character plate 6 is inclined in such a manner so as to face the driver, and the driver's view S is within a light-projecting region (wherein the light transmitted through the transparent portions of the character plate 6 is radiated) designated by Θ in FIG. 3. Since the character plate 6 is inclined toward the driver's side, the front window 50 of the vehicle is out of the above light-projecting region Θ.

The angle of mounting of the horn button 5 on the pad portion 2 is different from that of the character plate 6, and the horn button 5 is disposed generally horizontally to face upwardly.

Next, the operation of the steering wheel 1 of the above construction will now be described.

When the display lamp 15 is lit, the light emitted therefrom is reflected by the inner wall of the reflector 8, is then dissipated by the dissipation plate 10, and then causes the characters 17 of the character plate 6 to be luminously displayed. At this time, the driver's gaze S is within the light-projecting region Θ as shown in FIG. 3, and therefore the driver can judge the operating conditions of the associated devices from the luminously-displayed characters 17 on the character plate 6. Since the front window 50 of the vehicle is out of the light-projecting region Θ of the character plate 6, the light emitted from the character plate 6 is prevented from being reflected in the front window 50. Further, only the character plate 6 is inclined, and the horn button 5 is disposed generally horizontally. The driver can easily operate the horn merely by putting his fingers on the horn button 5 and depressing it.

As described above, with this simple construction, that is, merely by arranging the character plate 6 to face the driver's face, the light from the character plate 6 is prevented from being reflected in the front window 50. Thus, an additional member such as a light-intercepting cover does not need to be mounted on the pad portion 2, and the thickness of the pad portion 2 does not need to be increased as in the above described prior art.

As described above, in the steering wheel of this embodiment, the horn button 5 is provided generally horizontally, and only the portion of mounting of the character plate 6 is inclined to face the driver's face. Therefore, the operability of the horn button 5 is good, and a clear field of vision can be obtained by preventing the light from being reflected in the front window 50. Also, as shown in FIG. 1, the display lamp 15 is disposed deep within the reflector 8, and hence, the display lamp 15 does not lie on the driver's view S. Therefore, the driver will not directly see the display lamp 15, and will not be dazzled by it.

Further, since no additional member such as a light-intercepting cover is provided on the pad portion 2, an increase in the number of component parts is prevented. There is no risk that the appearance will be spoiled by a light-intercepting cover or other parts. Further, since the thickness of the pad portion 2 is not considerably increased, there is no need to adjust or modify the steering column 40 and its associated parts.

The present invention is not restricted to the above embodiment. For example, although the invention is described for a steering wheel 1 for a truck in the above embodiment, the invention can be embodied in a steering wheel for a passenger car.

Although the steering wheel 1 of the above embodiment is provided with the luminous display device in which the characters 17 of the character plate 6 are luminously displayed by the light from the display lamp 15, there can be used another type of luminous display device in which an LED is merely lit.

As described above, in the steering wheel of the present invention, the light is prevented from being reflected in the front window, thereby ensuring that a clear field of vision can be obtained. The attachment of the luminous display device does not require any modification of the steering column and its associated parts, and the number of the component parts is small, and the steering wheel has a good appearance. Thus, these excellent advantages are achieved.

Figure 6:
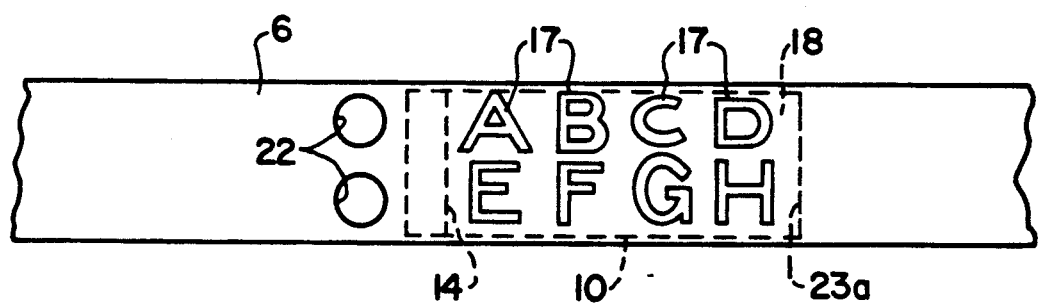
FIG. 6 is a detailed front-elevational view of a portion of a character plate of the luminous display device of FIG. 4.

Next, one example of luminous display device for a steering wheel of the above-mentioned type of vehicle, embodying the present invention, will now be described with reference to FIGS. 4 to 6.

Figure 5:
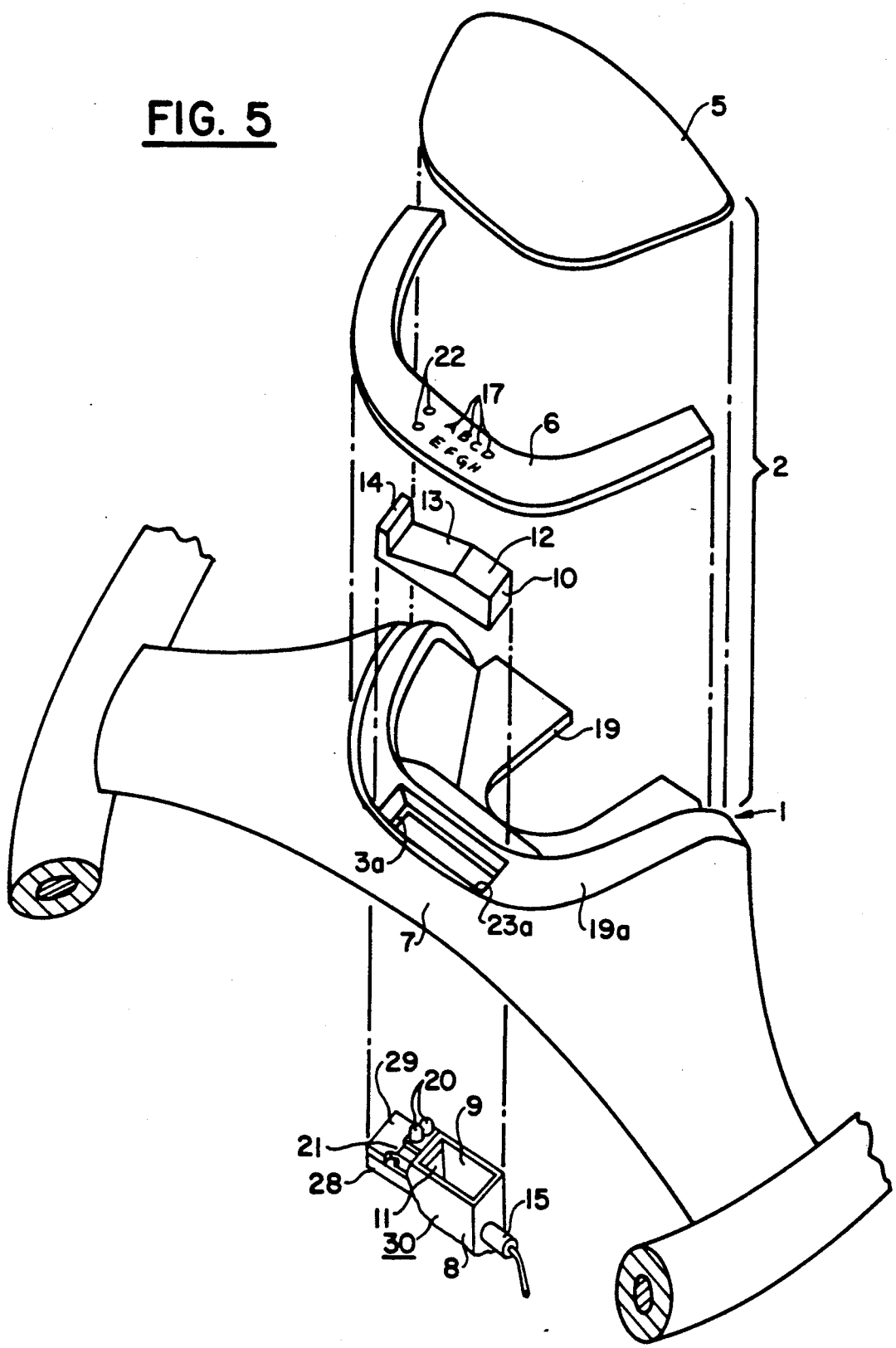
FIG. 5 is an exploded perspective view of the steering wheel according to the present invention.
Figure 7:
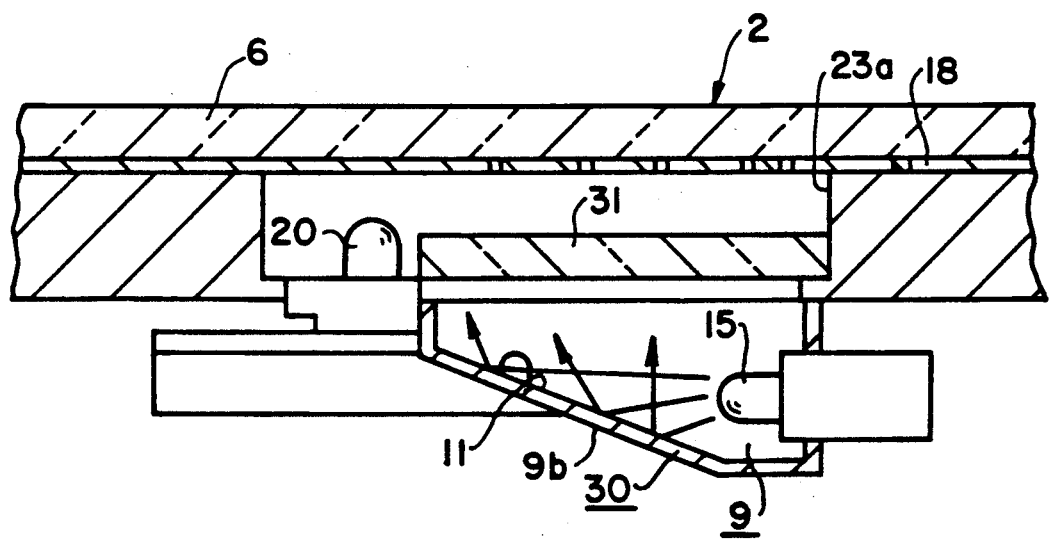
FIG. 7 is a cross-sectional view of a pad portion, showing a conventional luminous display device.

FIG. 5 is an exploded perspective view of the steering wheel. As shown in FIGS. 2 and 5, a pad portion 2 of the steering wheel has a switch receiving portion 19, and a horn pad 5 and other parts (not shown) are received in the switch receiving portion 19. A mounting portion 19a of a generally arcuate shape is formed at the periphery of the switch receiving portion 19. A through hole 23a of a rectangular shape is formed through the central portion of the mounting portion 19a. A lamp unit 30 is fixedly secured by screws (not shown) to the reverse surface of the pad portion 2, and covers the lower side of the through hole 23a. A dissipation plate 10 is fit in the through hole 23a from the upper side of the pad portion 2.

A character plate 6 of a generally arcuate shape is mounted on the upper surface of the mounting portion 19a in overlapping relation to the dissipation plate 10. A horn pad 5 is mounted on the switch receiving portion 19. As later described, the driver can confirm the operating conditions of associated devices of the vehicle through display of the character plate 6.

Figure 4:
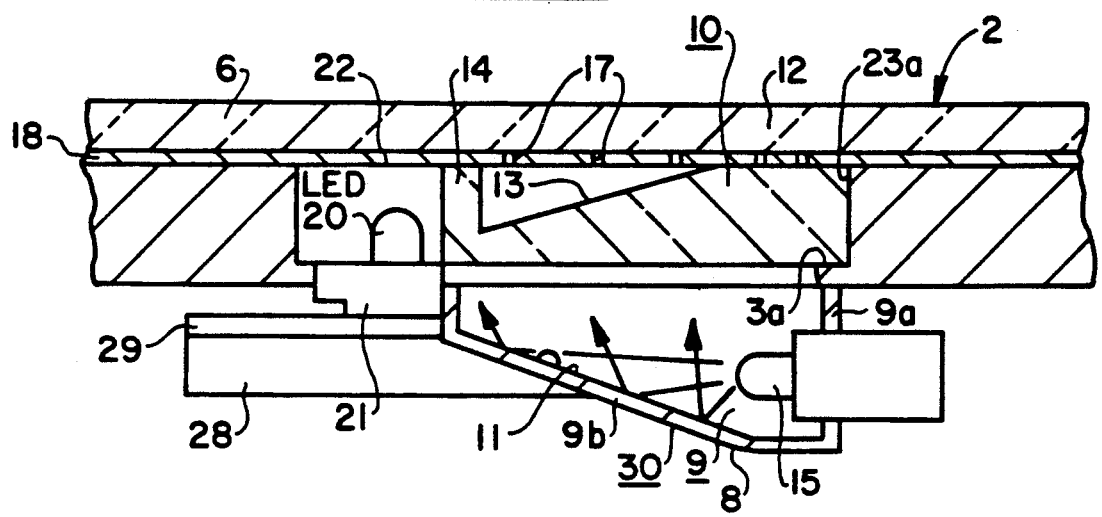
FIG. 4 is a cross-sectional view taken along the line 4—4 of FIG. 2, showing a luminous display device.

FIG. 4 is a cross-sectional view of the pad portion 2 of the luminous display device of this embodiment. FIG. 6 is a detailed front-elevational view of a portion of the character plate 6. In FIG. 4, the upper side represents the upper surface side of the pad portion 2, and the lower side shows the interior side of the pad portion 2. Referring to the mounting condition of the lamp unit 30, a body 8 of the lamp unit 30 has a reflection chamber 9 opening toward the through hole 23a of the pad portion 2. A display lamp 15 serving as a main light-emitting element is mounted on a side wall 9a of the reflection chamber 9. A bottom wall 9b of the reflection chamber 9 is inclined in such a manner as to gradually approach the upper surface side as the bottom wall 9b inclines away from the display lamp 15. The inner surface of the bottom wall 9b serves as a reflection surface 11. Therefore, light from the display lamp 15 is reflected by the reflection surface 11, and is directed into the through hole 23a of the pad portion 2. The display lamp 15 is lit in response to the operation of a light switch provided on the vehicle, so as to emit white light.

As described above, the dissipation plate 10 is mounted in the through hole 23a, and the dissipation plate 10 closes the reflection chamber 9, and is held in position by a retaining flange 3a formed in the through hole 23a. The dissipation plate 10 is made of a polyacetal resin, and is in the form of a translucent white plate. That portion of the upper surface of the dissipation plate 10 disposed close to the display lamp 15 is flat as at 12, and an inclined surface 13 is formed adjacent to the flat portion 12. The inclined surface 13 is inclined toward the light-reducing wall 14. Therefore, the thickness of the dissipation plate 10 becomes progressively smaller away from the display lamp 15. A thick light-reducing wall 14 is formed on that portion of the upper surface of the dissipation plate 10 remote from the display lamp 15.

The lower surface of the character plate 6 abuts against the flat portion 12 and the light-reducing wall 14 of the dissipation plate 10. A printing layer 18 is selectively formed on the lower surface of the character plate 6. The transparent portions, on which the printing layer 18 is not formed, form predetermined characters 17 above the dissipation plate 10. In this embodiment, names ABCD and EFGH of two devices associated with the vehicle are displayed by the characters 17, the name ABCD being disposed above the name EFGH.

A mounting seat 28 is formed integrally with the body 8 of the lamp unit 30, and is disposed adjacent to the reflection chamber 9. A printed board 29 is mounted on the mounting seat 28. A pair of LEDs 20 serving as second light-emitting means are fixedly mounted on the printed board 29 via a support member 21. The two LEDs 20 are disposed in opposed relation to the character plate 6 through the through hole 23a of the pad portion 2. These LEDs 20 are lit in response respectively to the operations of the devices associated with the vehicle, and emit green light. Transparent portions of a circular shape are formed at the printing layer 18 of the character plate 6, and disposed directly above the LEDs 20, respectively, and these transparent portions serve as lighting display portions 22. As shown in FIG. 6, the two lighting display portions 22 correspond respectively to the two rows of characters 17 respectively representing the above-mentioned two devices.

Next, the operation of the above luminous display device of the steering wheel will now be described.

In the night, when the light switch is turned on by the driver, the display lamp 15 is lit, and light from the display lamp 15 is reflected by the reflection surface 11 within the reflection chamber 9, and reaches the dissipation plate 10. The light is dissipated by the dissipation plate 10, and then is transmitted only through the transparent character portions 17 of the character plate 6. Therefore, the characters 17 are luminously displayed in white on the upper surface of the character plate 6. In the daytime, the characters on the character plate 6 can be recognized with the eyes even if the display lamp 15 is not lit.

When either of the above-mentioned two devices is operated by the driver, the LED 20 corresponding to the thus-operated device is lit. Therefore, the light emitted from this LED 20 is transmitted through the lighting display portion 22 to luminously display it in green. Based on the name indicated by the characters 17 and the lighting of the lighting display portion 22, the driver can confirm the operation of the device.

As described above, the light from the display lamp 15 is reflected by the reflection surface Il and reaches the dissipation plate 10. As shown in FIG. 4, the light reflected by those portions of the reflection surface 11 farther from the display lamp 15 travels along longer paths before reaching the dissipation plate 10. Therefore, the farther reflection surface 11 is from the display lamp 15, the weaker the light that reaches the dissipation plate 31 becomes. On the other hand, the thickness of the dissipation plate 10 becomes progressively smaller away from the display lamp 15, and the thinner portion of the dissipation plate 10 has a higher light transmissivity. Therefore, the unevenness of the light reaching the dissipation plate 10 is relieved, and the distribution of the light transmitted to the character plate 6 through the dissipation plate 10 is made uniform. The dissipation plate 10 has a uniform thickness at the flat portion 12, however, this portion is close to the display lamp 15 and provides a generally uniform light distribution. Therefore, there is no need to provide an inclined surface on this portion.

Since the dissipation plate 10 is separated from the LEDs 20 by the light-reducing wall 14, the light weakened by the dissipation plate 10 will not transmit through the light-reducing wall 14, and the light emitted from the display lamp 15 and the light emitted from the LEDs 20 are prevented from mixing together. This prevents an unclear display due to the mixing of the two lights, and also prevents the change of the color tones (white and green) due to the mixing of the two lights.

As described above, in the luminous display device of this embodiment for the steering wheel, the unevenness of the light reflected by the reflection surface 11 is relieved by the dissipation plate, thereby achieving a uniform light distribution. Therefore, the characters 17 luminously displayed on the character plate 6 can be made uniform in brightness.

Further, since the light on the side of the dissipation plate 10 and the light on the side of the LEDs 20 are prevented by the light-reducing wall 14 from being mixed together, the characters 17 and the lighting display portions 22 can always be luminously displayed clearly, and each display can be kept in the desired color tone.

The present invention is not restricted to the above embodiment. For example, in the above embodiment, although the invention is embodied in the luminous display device for the steering wheel, the invention may be embodied in a luminous display device to be provided on an instrument panel of the vehicle.

A coating may be formed on the side surface of the light-reducing wall 14 so as to prevent the light from the display lamp 15 and the light from the LEDs 20 from intruding into their respective opposite regions, thereby providing a complete light insulation.

As described above, in the luminous display device of the present invention, the light distribution is uniform so as to prevent any unevenness of the display. The light from the different light sources are prevented from being mixed together, thereby achieving a clear display of the desired color tone.

What is claimed is:

1. A steering wheel comprising:
    a pad portion;
    a ring portion;
    spokes joining said ring portion and said pad portion;
    a display device including a display portion mounted on said pad portion, said display device further including:
    a reflection chamber having an opening at one side thereof;
    a main light-emitting element mounted within said reflection chamber;
    a reflection surface provided in said reflection chamber for reflecting light emitted from said main light-emitting member through said opening toward an exterior of said reflection chamber;
    a dissipating plate mounted in said opening for dissipating light passing therethrough, said dissipating plate having a thickness that becomes progressively smaller as distance from said main light-emitting member increases;
    a character plate mounted above said dissipation plate so as to transmit the light through character portions thereof; and
    a sub light-emitting element mounted below said character plate and disposed proximate said reflection chamber.

2. A steering wheel as claimed in claim 1, wherein said dissipation plate is formed of a translucent material.

3. A steering wheel according to claim 1, wherein said luminous display device includes a light-emitting element.

4. A steering wheel comprising:
    a pad portion;
    a ring portion;
    spokes joining said ring portion and said pad portion;
    a display device including a display portion adjacent said pad portion, said display device further including:
    a reflection chamber having an opening at one side thereof;
    a main light-emitting element mounted within said reflection chamber;
    a reflection surface provided in said reflection chamber for reflecting light emitted from said main light-emitting member through said opening toward an exterior of said reflection chamber;
    a dissipating plate mounted in said opening for dissipating light passing therethrough;
    a character plate mounted above said dissipation plate so as to transmit the light through character portions thereof; and
    a sub light-emitting element mounted below said character plate and disposed proximate said reflection chamber;
    said dissipating plate including a light-reducing wall provided between said main and sub light-emitting elements, thereby preventing light from said main emitting element from mixing with light from said sub element.

5. A luminous display device according to claim 4, wherein said light-reducing wall has a coating formed on a side surface thereof so as to completely insulate the light.

6. A steering wheel as claimed in claim 4, wherein said dissipation plate is formed of a translucent material.

* * * * *